H. J. HJORTH.
HEAD STOCK OR CHUCK.
APPLICATION FILED MAR. 31, 1909.
1,005,214.
Patented Oct. 10, 1911.
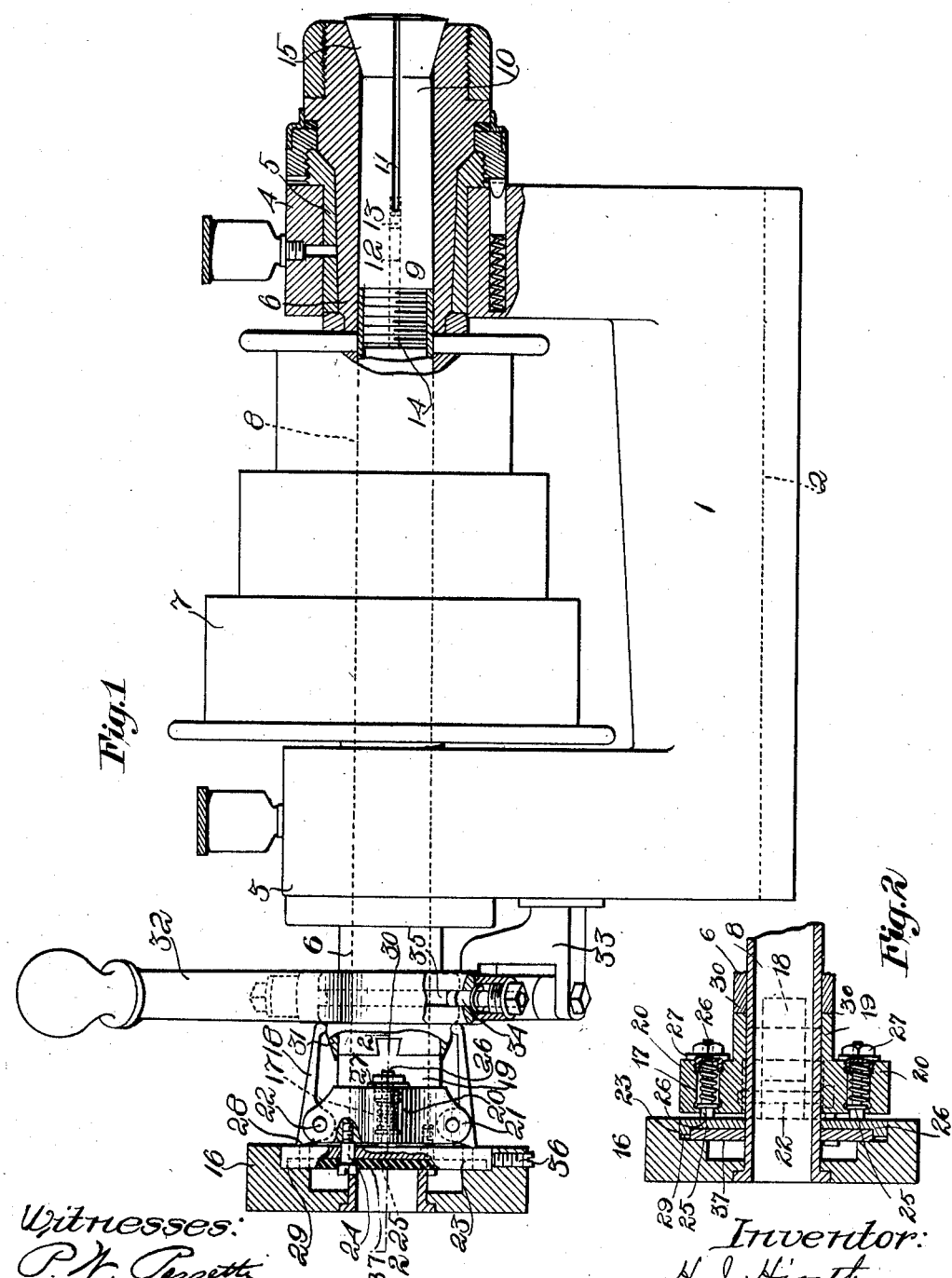
Witnesses:
P. W. Pezzetti
E. Batchelder
Inventor:
H. J. Hjorth
by Wright Brown Quimby May
Attys.

UNITED STATES PATENT OFFICE.

HENRY J. HJORTH, OF CAMBRIDGE, MASSACHUSETTS.

HEAD-STOCK OR CHUCK.

1,005,214.  Specification of Letters Patent.  Patented Oct. 10, 1911.

Application filed March 31, 1909. Serial No. 486,892.

*To all whom it may concern:*

Be it known that I, HENRY J. HJORTH, of Cambridge, in the county of Middlesex and State of Massachusetts, have invented certain new and useful Improvements in Head-Stocks or Chucks, of which the following is a specification.

This invention relates to head-stocks, especially those of small bench lathes, and particularly to a chuck and chuck closer forming a part of such a head-stock.

The object of the invention is to provide a novel automatic device for closing the jaws of the chuck, and in combination therewith to furnish an improved positive closer supplementing the action of the automatic closer, which is adjustable to vary the force with which the chuck jaws are closed together, and also to increase or diminish the extent of their motion in closing and opening.

In the drawing Figure 1 represents an elevation of a head-stock showing the chuck in longitudinal-section and the closer partly in elevation, partly broken away and partly in section. Fig. 2 represents a section taken on line 2—2 of Fig. 1.

In the drawing, 1 represents the head stock-body or bracket which is provided with a longitudinal guideway 2 so that it may slide on the ways of a bench lathe. The bracket has supports 3 and 4 containing bearings, one of which is shown as a bushing 5 to contain rotatably the outer tubular spindle 6. On this spindle is secured a step pulley 7 by which it is rotated. Within the outer spindle is an inner chuck spindle 8 which is connected with a chuck sleeve 9 having the jaws 10. The end of the bore of the outer spindle is made flaring, and the external surfaces of the chuck jaws also taper outwardly to fit the flaring mouth of the bore. The jaws are formed by longitudinal slots 11 in the sleeve, which partially split the sleeve into a number of segments, each segment being one of the jaws. The sleeve 9 has a longitudinal groove 12 in one of its sides into which projects a key or stud 13 projecting from the inner surface of the outer spindle 6. The chuck sleeve 9 has a threaded portion 14 upon which the chuck spindle 8 is threaded. By rotating this spindle, it may be disconnected from the clutch sleeve, and also the position of the latter may be adjusted so as to be more or less drawn into or projected from the outer spindle and caused to bear more or less tightly against the tapered seat 15 for the enlarged ends of the jaws.

The outer spindle 6 projects beyond the bearing 3 and the inner chuck spindle extends beyond the end of the spindle 5, having formed upon it a laterally extending flange or head 16 which is shaped as a hand wheel by which the inner spindle may be rotated to disconnect or adjust the jaws, and also to serve as an abutment for the chuck closer. This head or hand wheel is fitted tightly upon and soldered on the end of the inner chuck spindle.

The means for drawing the chuck jaws against the end of the spindle and exerting a frictional pressure against the head or hand wheel, and for causing the chuck to grip the work, consists respectively of springs 17 and levers 18, the former being resilient and automatic in their action, and the latter being positive and operated manually. Both the springs and levers are carried by a sleeve 19 which surrounds the inner spindle between the head 17 and the adjacent end of the outer spindle. This sleeve has near one end an enlarged portion provided with protuberances 20 and lugs 21. These protuberances are recessed and form pockets for the springs 17, while the lugs 21 contain the pivot pins 22 for the levers. Preferably there are two springs and two levers respectively located at diametrically opposite points, and the levers being intermediate the springs, though of course the number of each such elements is immaterial and may be more or less than two.

Connected with the end of the sleeve 19 is a disk 23 held with provision for a limited movement in the direction of its axis by studs 24. These studs are screwed into the end of the sleeve 19 and hold the disk loosely. The springs 17 act on the disk, bearing against shoulders 25 on pins 26, and abutting against nuts 27 which are screwed into the ends of the spring pockets and through which the pins 26 extend. The tendency of the springs is thus to hold the disk away from the sleeve. The levers 18 have short arms 28 which bear against the disk. They also have long arms lying approximately parallel with the axis of the spindle and sleeve, and the short arms are so arranged that when the long arms are moved outwardly, pressure is brought to bear on the disk.

It will be noted that the surface of the disk on which the short arms 28 bear is plane and perpendicular to the axis of the spindle, also that these short arms extend outwardly from their pivots nearly parallel to this surface. Hence the pressure exerted on the disk by the levers is in a line approximately parallel to the axis of the spindle and there is almost no sliding of the lever arms on the disk and consequently practically no frictional resistance to their action.

When the parts are in their proper relation, the head 16 of the inner spindle lies beside the disk 23 and has a recess 29 in which this disk is contained. Consequently pressure applied to the disk acts on the head 16, with the result of moving the chuck spindle endwise and causing the chuck jaws to be closed together.

The sleeve 19 is detachably connected to the end of the outer spindle by dove-tail tongues 30 on the sleeve contained in correspondingly shaped notches in the spindle. The levers are actuated by a sleeve 31 of which the end nearest the levers is tapered conically, which sleeve is keyed to the outer spindle so that it may move endwise thereon, and is operated by a hand lever 32. The lever is pivoted to a bracket 33 projecting from the head stock frame, and has adjustable pins 34 extending into an annular groove 35 in the actuating sleeve 31. When the lever is moved to the left, the conical end of the actuator is inserted between the spindle and the longer arms of the levers 18, forcing them outward and causing their short arms 28 to bear against the disk and head.

The head 16 may be rotated as previously described, so as to adjust the position of the chuck jaws. An adjustment is made such that tension is normally exerted on the springs 17, and such that the disk 23 is held to intersect the path of movement of the lever arms 28, at the same time allowing the latter sufficient play so that their longer arms may ride up on the conical sleeve until they bear on the outer cylindrical surface thereof. By adjusting the head, the distance thereof and of the disk from the lever pivots 22 may be varied so that a greater or less degree of force can be brought to bear by the levers. When once an adjustment is made, it is retained by means of a locking screw 36 contained in the head 16 and bearing against the disk 23. Independently of the locking screw, however, the pressure of the disk 23 against the hand wheel or head 16 serves as an additional frictional lock for maintaining this adjustment. When the inner spindle or chuck adjusting bar is screwed upon the chuck sufficiently to bring the head 16 against the disk 23 and to compress the springs 17, the latter exert pressure against the disk holding the latter against the head with sufficient force to hold the head frictionally and prevent it from either lagging behind when the spindle is first set into rotation, or from the over motion due to spinning when the spindle is stopped. Preferably the disk is made of steel and a fiber washer 37 is placed between it and the head 16 to increase the friction, but this is not an essential element of my invention, as the disk may be made if desired of other materials having a greater coefficient of friction than steel, and the washer may be dispensed with. The outer and inner spindles, the chuck jaws, sleeve 19, cone 31, and disk 23 all rotate together when driven by power applied to the step pulley 7. The tongue and notch connection between the sleeve 19 and outer spindle serves both to impart this rotation to the sleeve and also to prevent the sleeve being moved endwise.

When the chuck is correctly adjusted, the springs 17 exert a pressure which draws the jaws against the end of the spindle, but which can be overcome by manual force applied to the head 16. When the latter is moved toward the right, the jaws are projected and allowed to open so that the work can be inserted or removed. Upon being released, the springs 17 then cause the chuck to grasp the work lightly and the grip exerted by the jaws can then be increased and made positive by operating the lever 32 and thereby applying a positive pressure to the chuck spindle. It is to be noted that the levers are pivoted to a part which forms an extension of the tubular spindle, and exert their pressure against a part of the chuck spindle when acted on by the conical actuator.

I claim:—

1. A head-stock for lathes comprising a bracket having bearings, a tubular spindle held rotatably in said bearings, a chuck spindle contained in said spindle and movable longitudinally therein, chuck jaws secured to said chuck spindle and having enlarged ends bearing externally in the end of said tubular spindle, a head on the outer end of said chuck spindle, a disk loosely connected with said tubular spindle, and springs carried by said tubular spindle acting on said disk to press the latter into frictional contact with said head and, by pressing on the head, move said chuck spindle in the jaw-closing direction.

2. In a lathe headstock, a spindle, an expansible chuck contained in said spindle and movable endwise therein to cause opening and closing of its jaws, an inner rod threaded into engagement with said chuck and operated rotatively to adjust the latter, a head on said rod by which it may be rotated relatively to the chuck, and spring-actuated friction means carried by said spindle including a piece loosely connected to the spindle and moved axially with respect thereto bearing on said head for retaining the latter and bar in their adjustments and prevent lagging or over-motion thereof.

3. A head-stock comprising a bracket having bearings, a tubular spindle held in said bearings, an inner chuck spindle, a chuck having spring-separated jaws threaded to the end of said chuck spindle, said chuck jaws being constructed and arranged so as to be closed when drawn into the tubular spindle, yielding means tending to move said chuck spindle and chuck jaws in the direction necessary to close the jaws, and positive means for moving the chuck spindle in the same direction to increase the force with which the jaws are closed.

4. A chuck comprising a rotatably mounted tubular outer spindle having its bore made flaring at one end, a sleeve with an enlarged end formed to fit the bore of said spindle and split longitudinally to make resilient chuck jaws, an inner spindle to which said sleeve is detachably connected, the outer end of said inner spindle extending beyond the end of the outer spindle and having a lateral flange, a sleeve surrounding the inner spindle and engaged with the outer spindle between the end thereof and said head, levers pivoted to said sleeve having arms lying approximately parallel thereto and being formed with portions adapted to exert pressure on said head when said arms are moved outward, a disk carried by said sleeve between the latter and the head, against which the said levers directly bear, said disk having sufficient looseness to permit a limited amount of movement axially, and a conical sleeve arranged to move between said lever arms and the spindles to force the arms outward, and thereby move the inner spindle endwise to close the chuck jaws.

5. A chuck comprising a rotatably mounted tubular outer spindle having its bore made flaring at one end, a sleeve with an enlarged end formed to fit the bore of said spindle and split longitudinally to make resilient chuck jaws, an inner spindle to which said sleeve is detachably connected, the outer end of said inner spindle extending beyond the end of the outer spindle and having a lateral flange, a sleeve surrounding the inner spindle between said head and the adjacent end of the outer spindle, said sleeve and outer spindle having an interlocking tongue and notch constructed to prevent axial movement of the sleeve, a disk loosely connected to said sleeve beside the head so that it may move endwise, levers pivoted to said sleeve having arms lying approximately parallel thereto and being formed with portions adapted to bear on said disk and thereby exert pressure on said head when said arms are moved outward, and a conical sleeve arranged to move between said lever arms and the spindles to force the arms outward and thereby move the inner spindle endwise to close the chuck jaws.

6. A chuck comprising a rotatably mounted tubular outer spindle having its bore made flaring at one end, a sleeve with an enlarged end formed to fit the bore of said spindle and split longitudinally to make resilient chuck jaws, an inner spindle to which said sleeve is detachably connected, the outer end of said inner spindle extending beyond the end of the outer spindle and having a lateral flange, a sleeve surrounding the inner spindle between said head and the adjacent end of the outer spindle, and a disk loosely connected to said sleeve beside the head so that it may move endwise, a spring carried by the sleeve arranged to bear on said disk and press the same outward against the head, levers pivoted to the sleeve having arms lying approximately parallel thereto and being formed with portions adapted to bear on said disk and thereby exert pressure on said head when said arms are moved outward, and a conical sleeve arranged to move between said lever arms and the spindles to force the arms outward, and thereby move the inner spindle endwise to close the chuck jaws.

7. In a chuck, a sleeve having an enlargement surrounding one end, a disk fastened to said enlargement with provision for movement toward and from the enlargement, springs contained in said enlargement bearing against said disk, and levers pivoted to the enlargement having outwardly projecting arms adapted to bear against the disk, and arms lying approximately parallel to the axis of the sleeve.

8. In a chuck, a sleeve, a disk pinned to one end of said sleeve with provision for a limited movement in the direction of the axis thereof, levers pivoted externally on said sleeve having outwardly projecting short arms arranged to bear on said disk and long arms lying approximately parallel to the axis of the sleeve, and a chuck closing spindle having an abutment against which the disk is pressed by the short lever arms.

9. In a chuck, a sleeve, a disk pinned to one end of said sleeve with provision for a limited movement in the direction of the axis thereof, levers pivoted externally on said sleeve having outwardly projecting short arms arranged to bear on said disk and long arms lying approximately parallel to the axis of the sleeve, a tubular outer spindle to the end of which said sleeve is detachably connected, an inner spindle passing through said sleeve and outer spindle, chuck jaws adjustably attached to said inner spindle by a screw connection, a hand wheel on the inner spindle beside the disk adapted to be rotated for adjusting said connection, and a locking device engaging said hand wheel and disk together to secure the adjustments of the wheel.

10. In a chuck, an outer tubular spindle having a tapered seat for chuck jaws, a chuck sleeve split to form resilient jaws and shaped externally to fit said seat, a chuck spindle extending through said outer spindle adjustably connected to said chuck sleeve and rotatable to draw the jaws more or less against the seat, a hand wheel or nut on said chuck spindle whereby the latter may be so turned, a disk connected with the outer spindle and engaging said wheel, a lock for holding said disk and wheel together and preventing rotation of the latter, a conical sleeve sliding longitudinally on the outer spindle, and levers pivotally connected with the outer sleeve and operated by said sleeve so as to bear against the disk and force the chuck jaws against the seat.

11. In a chuck, clamping jaws, a rotating spindle having a tapered seat with which the outer surfaces of said jaws make contact, a spindle to which said jaws are connected and by the endwise movement of which the jaws are closed or opened, means for yieldingly moving the second spindle in the direction necessary to close the jaws, means for forcibly moving it in the same direction, means by which rotation of the last-named spindle relatively to the first spindle adjusts the jaws, and locking means for securing the adjustments thereof.

In testimony whereof I have affixed my signature, in presence of two witnesses.

HENRY J. HJORTH.

Witnesses:
ELIZABETH M. BERTSCH,
CHARLES F. REMINGTON.